(12) United States Patent
Wijekoon

(10) Patent No.: US 12,155,310 B2
(45) Date of Patent: Nov. 26, 2024

(54) DC-TO-DC POWER CONVERTER

(71) Applicant: Huawei Technologies Co., Ltd., Shenzhen (CN)

(72) Inventor: Piniwan Thiwanka Bandara Wijekoon, Nuremberg (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 275 days.

(21) Appl. No.: 17/562,659

(22) Filed: Dec. 27, 2021

(65) Prior Publication Data
US 2022/0123655 A1 Apr. 21, 2022

Related U.S. Application Data

(63) Continuation of application No. PCT/EP2019/066760, filed on Jun. 25, 2019.

(51) Int. Cl.
*H02M 3/158* (2006.01)
*H02J 7/35* (2006.01)

(52) U.S. Cl.
CPC ............. *H02M 3/1584* (2013.01); *H02J 7/35* (2013.01)

(58) Field of Classification Search
CPC ............ H02M 3/00; H02M 3/04; H02M 3/06; H02M 3/07; H02M 3/158; H02M 3/1584; H02J 7/35; Y02B 70/10; Y02B 70/40; Y02E 10/56
See application file for complete search history.

(56) References Cited

U.S. PATENT DOCUMENTS

| | | | | |
|---|---|---|---|---|
| 5,412,557 A | * | 5/1995 | Lauw | H02M 7/4826 |
| | | | | 363/40 |
| 9,413,221 B1 | * | 8/2016 | Kim | H02M 7/217 |
| 11,277,004 B1 | * | 3/2022 | Katikaneni | H02S 40/36 |
| 11,575,332 B1 | * | 2/2023 | Ginart | H02M 7/493 |
| 11,758,700 B1 | * | 9/2023 | Inam | H05K 7/14339 |
| | | | | 361/699 |

(Continued)

FOREIGN PATENT DOCUMENTS

| | | |
|---|---|---|
| CN | 103199727 A | 7/2013 |
| CN | 103633872 A | 3/2014 |

(Continued)

OTHER PUBLICATIONS

Zhang et al., "A Step-Down Partial Power Optimizer Structure for Photovoltaic Series-Connected Power Optimizer System," IEEE, total 4 pages, Institute of Electrical and Electronics Engineers, New York, New York (2018).

(Continued)

*Primary Examiner* — Yusef A Ahmed
(74) *Attorney, Agent, or Firm* — Leydig, Voit & Mayer, Ltd.

(57) ABSTRACT

A DC-to-DC power converter includes at least two energy buffers. Each energy buffer unit is configured to receive a first-type voltage component and to respectively produce a voltage at an output of the DC-to-DC power converter, and the DC-to-DC power converter also includes at least one energy exchanger. The at least one energy exchanger is connected to the at least two energy buffers and is configured to exchange energy between the at least two energy buffers.

14 Claims, 9 Drawing Sheets

(56) References Cited

U.S. PATENT DOCUMENTS

| | | | | |
|---|---|---|---|---|
| 11,769,218 B1* | 9/2023 | Ramesh | | G06Q 50/06 |
| | | | | 700/291 |
| 2011/0121661 A1* | 5/2011 | Kawakami | | H02J 7/35 |
| | | | | 307/110 |
| 2011/0199801 A1* | 8/2011 | Grbovic | | H02P 27/06 |
| | | | | 363/131 |
| 2011/0205768 A1* | 8/2011 | Svensson | | H02M 7/4835 |
| | | | | 363/49 |
| 2011/0273917 A1* | 11/2011 | Maitra | | H02J 3/46 |
| | | | | 363/74 |
| 2012/0092906 A1* | 4/2012 | Hasler | | H02J 3/1857 |
| | | | | 363/39 |
| 2012/0166013 A1* | 6/2012 | Park | | H02J 3/32 |
| | | | | 700/297 |
| 2013/0026841 A1* | 1/2013 | Hosini | | H02M 7/4835 |
| | | | | 307/77 |
| 2013/0121045 A1* | 5/2013 | Murakami | | H02M 1/4233 |
| | | | | 363/67 |
| 2013/0182474 A1* | 7/2013 | Luo | | H02J 3/381 |
| | | | | 363/95 |
| 2014/0268888 A1* | 9/2014 | Lv | | H02M 7/4835 |
| | | | | 363/10 |
| 2014/0369098 A1* | 12/2014 | Li | | H02S 40/32 |
| | | | | 363/95 |
| 2016/0006365 A1* | 1/2016 | Perreault | | H02M 1/4208 |
| | | | | 363/89 |
| 2018/0026450 A1* | 1/2018 | Moriyama | | H02M 3/1584 |
| | | | | 307/51 |
| 2018/0054064 A1* | 2/2018 | Narla | | H02J 9/061 |
| 2018/0102644 A1* | 4/2018 | Perreault | | H02M 7/68 |
| 2018/0123341 A1* | 5/2018 | Lehn | | H02M 1/15 |
| 2019/0103750 A1* | 4/2019 | Kristensen | | H01M 10/441 |
| 2019/0363644 A1* | 11/2019 | Li | | H02M 7/5387 |
| 2021/0184594 A1* | 6/2021 | Shen | | H02M 7/4833 |
| 2022/0039298 A1* | 2/2022 | Inam | | H02J 3/1842 |
| 2022/0121260 A1* | 4/2022 | King | | G06F 1/28 |
| 2022/0166313 A1* | 5/2022 | Wang | | H02M 3/155 |
| 2023/0089387 A1* | 3/2023 | Wijekoon | | H02M 3/158 |
| | | | | 323/271 |
| 2023/0134237 A1* | 5/2023 | Wildgruber | | H02M 1/0074 |
| | | | | 307/9.1 |
| 2023/0216399 A1* | 7/2023 | Wijekoon | | H02M 7/4833 |
| | | | | 323/271 |
| 2023/0387693 A1* | 11/2023 | Xu | | H02J 3/381 |
| 2024/0154425 A1* | 5/2024 | Kim | | H02J 3/12 |

FOREIGN PATENT DOCUMENTS

| | | | | |
|---|---|---|---|---|
| CN | 107196539 A | | 9/2017 | |
| DE | 10136147 A1 | | 2/2003 | |
| DE | 102014002592 A1 | | 8/2015 | |
| EP | 2595291 A1 | * | 5/2013 | ............ H02M 1/12 |
| JP | 2005224094 A | | 8/2005 | |
| JP | 2008092628 A | | 4/2008 | |
| WO | WO-2014182291 A1 | * | 11/2014 | ............ B66B 1/302 |
| WO | 2016124681 A1 | | 8/2016 | |
| WO | 2017000532 A1 | | 1/2017 | |

OTHER PUBLICATIONS

Elrayyah et al.,"Feeding Partial Power into Line Capacitors for Low Cost and Efficient MPPT of Photovoltaic Strings," IEEE, pp. 392-397, Institute of Electrical and Electronics Engineers, New York, New York (2016).

* cited by examiner

DC-TO-DC POWER CONVERTER

CROSS-REFERENCE TO RELATED APPLICATIONS

This application is a continuation of International Application No. PCT/EP2019/066760, filed on Jun. 25, 2019, the disclosure of which is hereby incorporated by reference in its entirety.

FIELD

The present disclosure relates to a DC-to-DC power converter. In particular, the DC-to-DC power converter is for an electrical energy conversion system, which is, for example, configured to convert electrical energy provided by at least one solar panel. The present disclosure also relates to the electrical energy conversion system.

BACKGROUND

Solar photovoltaic (PV) panels (or "solar panels" for short, and also commonly known as "solar modules") are used to convert solar energy into direct current (DC) power. Because solar panels are a limited source of energy, they behave differently than a conventional DC power supply.

The output voltage from the PV cells that make up a solar panel varies depending on the current being drawn from the panel. The solar panel power (i.e., the product of panel voltage and panel current) is not constant for all combinations of voltages and currents. There is one operating point where the product of the panel voltage and the panel current is highest. This point is called the maximum power point (MPP).

The amount of power, which can be harvested from solar panels, varies in real time as solar panels are exposed to different lighting intensity levels, clouds, or dirt. In addition, solar panels show a tendency to age, which reduces the power-harvesting ability of the panels. The panel performance also depends on operating temperature. These factors cause the MPP to vary over time.

A system or circuit designed to track the MPP in real time is referred to as a MPP tracker (MPPT) or power-point tracker.

In an application, in which the output power of a solar panel is used to store energy in a battery or other storage element, once the MPPT locates the MPP, the output should be translated into a voltage level that matches the battery specifications (or storage element specifications). A system or circuit that performs this translation is referred to as a battery charger. The battery charger ensures that charging requirements of the battery (e.g., as specified in the battery specifications) are met.

The battery nominal voltage requirement can be higher or lower than the MPP voltage of the solar panel (i.e., the output voltage of the solar panel at the MPP) by system design or due to variation of electrical parameters of the solar panel. DC-to-DC conversion is performed to provide the desired charging voltage level for the battery. Buck and/or boost techniques may be used in performing this DC-to-DC conversion.

However, nowadays technologies for such MPPT DC-to-DC converters either use high voltage semiconductor devices or multiple low voltage devices in series or parallel to form the converter circuitry, which in turn increases the cost and reduces reliability. Moreover, these applications need higher efficiency in terms of electrical efficiency (output power vs. input power), weight efficiency (output power vs. weight), and size efficiency (output power vs. size).

Thus, there is a need for an improved DC-to-DC power converter.

SUMMARY

In view of the above-mentioned problems and disadvantages, embodiments of the present disclosure provide improvements to the conventional DC-to-DC power converters and their productions methods. Embodiments of the present invention, therefore, provide an improved DC-to-DC power converter, in particular for a solar panel system.

According to a first aspect of the present disclosure, a DC-to-DC power converter is provided, comprising at least two energy buffer units (buffers), wherein each energy buffer unit is configured to receive a first-type voltage component and to respectively produce a voltage Vb at an output of the DC-to-DC power converter; and at least one energy exchanger, wherein the at least one energy exchanger is connected to the at least two energy buffer units and is configured to exchange energy between the at least two energy buffer units.

This has the advantage that an improved DC-to-DC power converter is provided. The power converter is highly integrated, comprises a low number of components, and efficiently combines energy buffer units together with an energy exchanger in order to obtain a DC-to-DC power conversion. Moreover, the DC-to-DC power converter has a low cost and converts a DC energy to another form of DC energy in an efficient manner. The power converter can, for example, be used to convert the power provided by a solar panel system.

In an implementation form of the first aspect, each energy buffer unit is based on a half-bridge or a full-bridge structure.

This provides the advantage that well known structures, such as a half-bridge and a full-bridge structure, can be used in order to implement the energy buffer unit.

In a further implementation form of the first aspect, the full-bridge structure comprises four low-voltage semiconductor switches.

This provides the advantage that low-voltage and low-cost semiconductor devices, in particular switches, can be used in the DC-to-DC converter. Moreover, the switches can be characterized by very low static and dynamic losses and can be operated at high switching frequencies.

In a further implementation form of the first aspect, the half- or full-bridge structure comprises a capacitor, wherein for a voltage Vc across the capacitor:

$$Vb = \begin{cases} Va \\ Va \pm Vc \end{cases},$$

wherein Va is the first-type voltage component received by the energy buffer unit.

This provides the advantage that the voltage Vb at an output of the DC-to-DC power converter can be estimated and implemented in an easy way.

In a further implementation form of the first aspect, each first-type voltage component is a positive voltage component or a negative voltage component.

This has the advantage that a certain flexibility is provided in the choice of the first-type voltage component.

In a further implementation form of the first aspect, the at least one energy exchanger is based on a resonant balancer circuitry.

This has the advantage that the resonant balancer circuitry operates high efficiently with soft switching and with no switching losses.

In a further implementation form of the first aspect, the resonant balancer circuitry has a configuration comprising at least four switches, two capacitors, and an inductor, and wherein the two resonant capacitors and the inductor are excitable to exchange energy between the capacitors.

This has the advantage that a low size of the circuitry can be achieved by moving towards a high frequency operation. Moreover, this embodiment provides the advantage that simplified gate drivers and a simplified control hardware can be used. Moreover, during the energy exchange between the capacitors, a soft switching can be achieved and this results in almost no switching losses.

In a further implementation form of the first aspect, the at least one energy exchanger is comprised between the at least two energy buffer units.

According to a second aspect of the present disclosure, an electrical energy conversion system comprising a DC-to-DC power converter according to the first aspect or any one of the implementation forms thereof is provided.

In an implementation form of the second aspect, the electrical energy conversion system further comprises a DC-to-AC inverter, and wherein the output of the DC-to-DC power converter is connected to the DC-to-AC inverter.

In a further implementation form of the second aspect, the electrical energy conversion system further comprises a DC transmission system, and wherein the output of the DC-to-DC power converter is connected to the DC transmission system.

In a further implementation form of the second aspect, the electrical energy conversion system further comprises a solid state transformer, and wherein the output of the DC-to-DC power converter is connected to the solid state transformer.

In a further implementation form of the second aspect, the electrical energy conversion system further comprises a battery, wherein the battery is configured to store an energy in excess generated from a solar panel.

This has the advantage that the battery facilitates the maximization of the harvest during a long time, and provides flexibility in the usage of the stored energy in the case the solar energy is not available or minimal.

In a further implementation form of the second aspect, the electrical energy conversion system further comprises ultra-capacitors, wherein the ultra-capacitors are configured to store an energy in excess generated from the solar panel.

This has the advantage that the ultra-capacitors facilitate the maximization of the harvest during a long time, and provides flexibility in the usage of the stored energy in the case the solar energy is not available or minimal.

According to a third aspect of the present disclosure, a method for a DC-to-DC power converter comprising at least two energy buffer units and at least one energy exchanged is provided, the method comprising the steps of receiving, by each energy buffer unit, a first-type voltage component; producing, by each energy buffer unit, a voltage Vb at an output of the DC-to-DC power converter; and exchanging, by the at least one energy exchanger, energy between at least two energy buffer units.

In an implementation form of the third aspect, each energy buffer unit is based on a half-bridge or a full-bridge structure.

In a further implementation form of the third aspect, the full-bridge structure comprises four low-voltage semiconductor switches.

In a further implementation form of the third aspect, the half- or full-bridge structure comprises a capacitor, wherein for a voltage Vc across the capacitor:

$$Vb = \begin{cases} Va \\ Va \pm Vc \end{cases},$$

wherein Va is the first-type voltage component received by the energy buffer unit.

In a further implementation form of the third aspect, each first-type voltage component is a positive voltage component or a negative voltage component.

In a further implementation form of the third aspect, the at least one energy exchanger is based on a resonant balancer circuitry.

In a further implementation form of the third aspect, the resonant balancer circuitry has a configuration comprising at least four switches, two capacitors, and an inductor, and wherein the two resonant capacitors and the inductor are excitable to exchange energy between the capacitors.

In a further implementation form of the third aspect, the at least one energy exchanger is comprised between the at least two energy buffer units.

The method of the third aspect and its respective implementation forms provide the same advantages and effects as described above for the device of the first aspect and its respective implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of exemplary embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of exemplary embodiments in relation to the enclosed drawings, in which.

DETAILED DESCRIPTION

Figure 1:
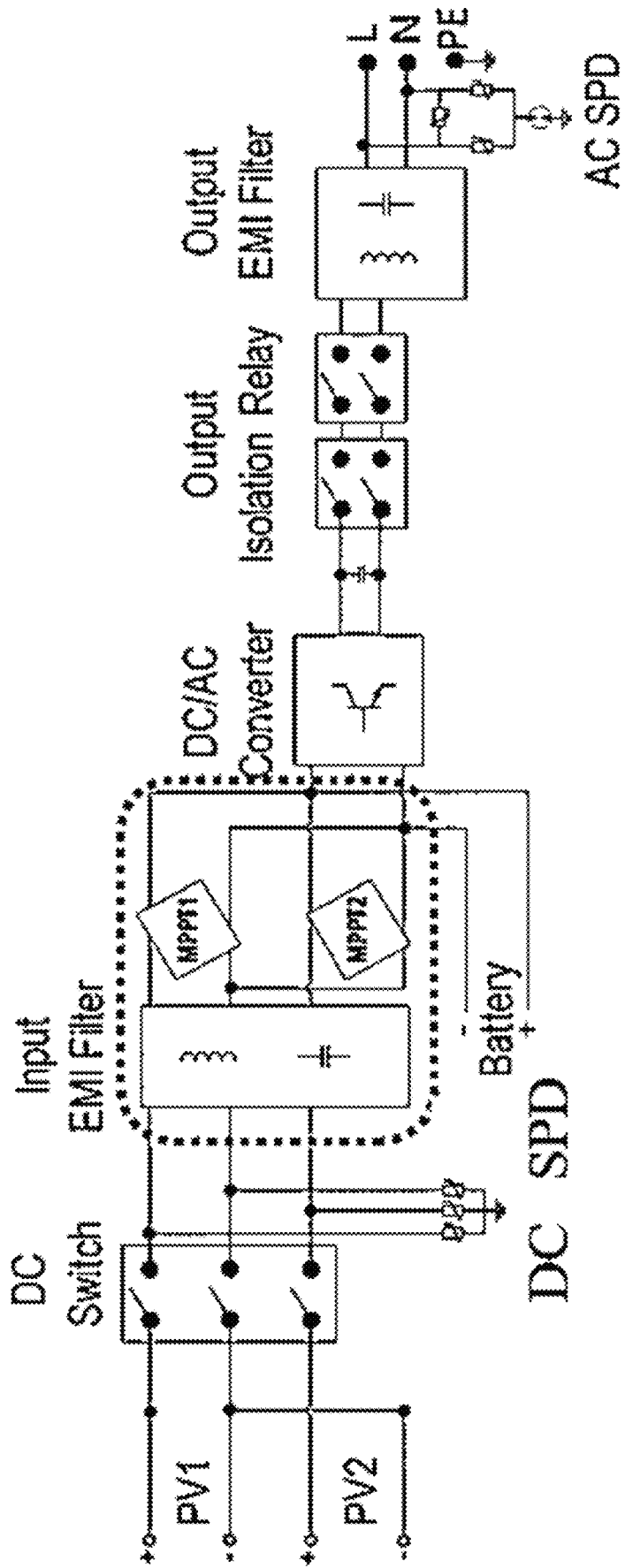
FIG. 1 shows a schematic representation of an exemplary electrical energy conversion system comprising a DC-to-DC converter.
Figure 2:
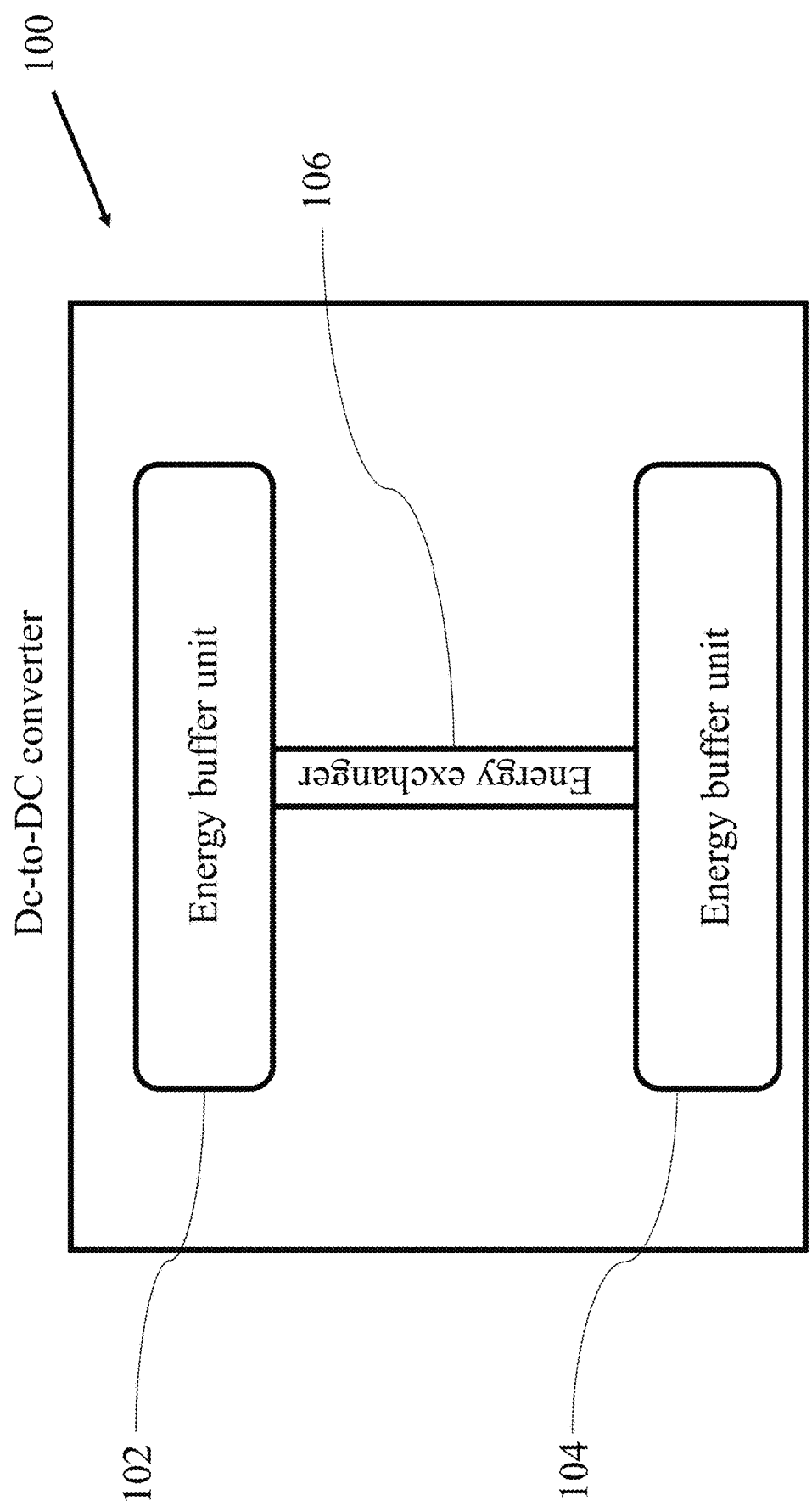
FIG. 2 shows a schematic representation of a DC-to-DC-power converter according to an embodiment.

FIG. 2 shows schematically a DC-to-DC-power converter 100 according to an embodiment of the disclosure.

The DC-to-DC-power converter 100 comprises at least two energy buffer units 102, 104, wherein each energy buffer unit 102, 104 is configured to receive a first-type voltage component and to respectively produce a voltage Vb at an output of the DC-to-DC power converter 100; and at least one energy exchanger 106, wherein the at least one energy exchanger 106 is connected to the at least two energy buffer units 102, 104 and is configured to exchange energy between the at least two energy buffer units (buffers) 102, 104.

Each first-type voltage component can be either a positive voltage component or a negative voltage component.

Figure 3:
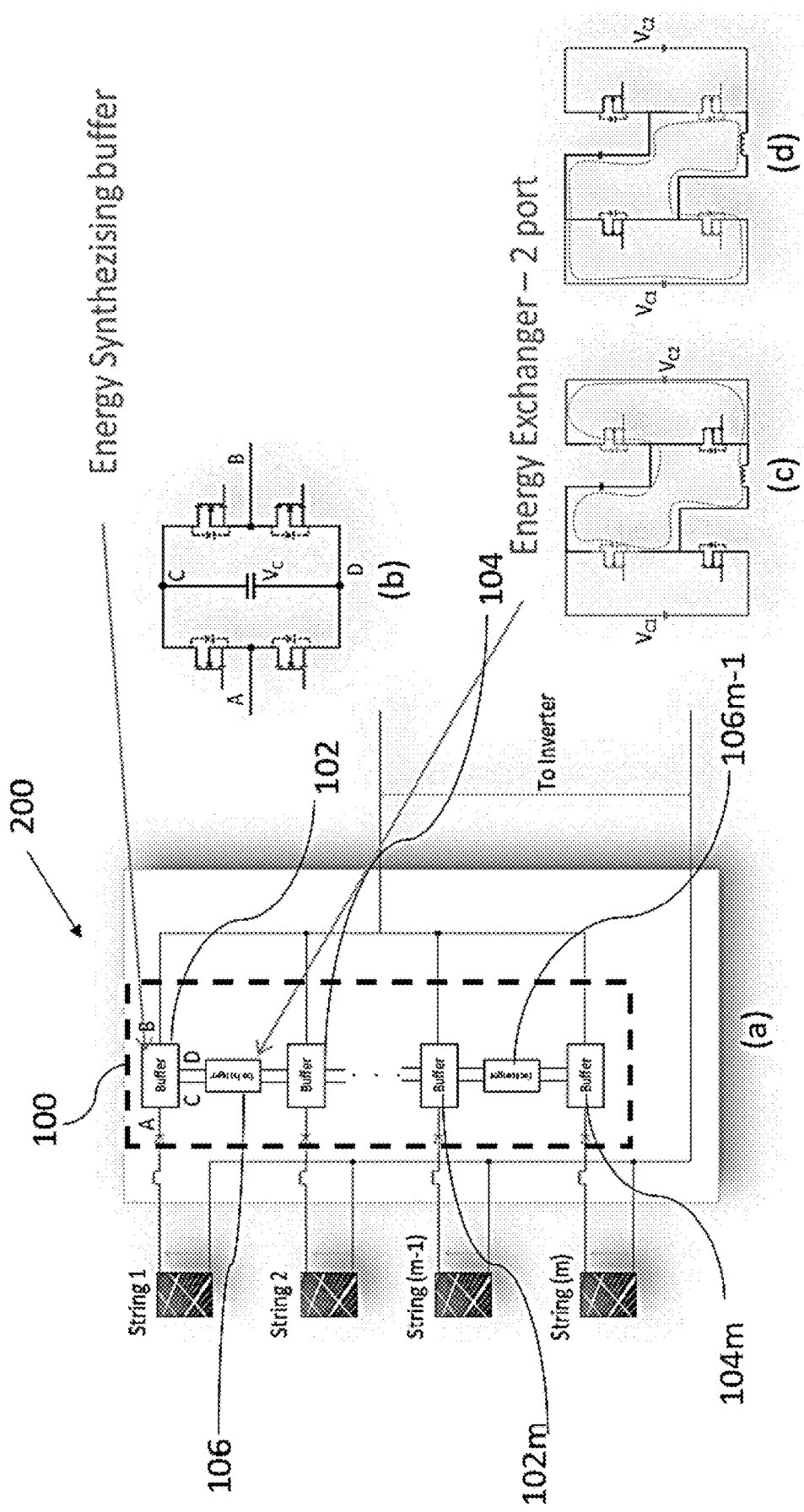
FIG. 3 shows a schematic representation of an electrical energy conversion system comprising a DC-to-DC converter according to an embodiment.

FIG. 3 shows a schematic representation of an electrical energy conversion system 200 comprising a DC-to-DC converter 100 according to an embodiment of the disclosure.

In particular, the DC-to-DC converter 100 may be the one shown in FIG. 2.

In this embodiment, the electrical energy conversion system 200 comprises the DC-to-DC converter 100, wherein the DC-to-DC converter 100 comprises the energy buffer units 102 . . . 102m, 104 . . . , 104m and the energy exchangers 106, . . . , 106m-1, wherein the energy exchangers 106, . . . , 106m-1 are placed between the energy buffer units 102 . . . 102m, 104 . . . , 104m, respectively.

In this embodiment, a DC-to-DC power converter topology and control mechanism (referred to as "converter") as used in solar PV electrical energy conversion applications is exemplarily described. In particular, the converter DC-to-DC 100 can be configured to translate DC electrical power generated from one or more solar panels, string1, . . . , string(m), to another form of DC electrical power. The input of the DC-to-Dc converter 100 can directly be connected to multiple solar panels or strings, string1, . . . , string(m), (e.g. many panels in series or parallel).

The output of the DC-to-DC converter 100 can be connected to either a DC-to-AC inverter, which translates the DC power to AC power, or to a DC transmission system, or to a solid state transformer.

The DC-to-DC converter 100 provides the advantage that a low voltage can be used. Moreover, low cost semiconductor devices can be used to operate at higher DC voltages by means of the circuit arrangement according to this embodiment.

Thereby, the DC-to-DC power converter 100 advantageously enables the design of modular PV inverters with high electrical efficiency, due to lower voltage semiconductor devices, and by means of the integration of control and driving circuits in close proximity to the switching power cells. Thereby delays and latencies in the control loop are minimized.

This embodiment is based on processing only the minimal amount of differential power. This improves the overall efficiency and power density. The MPPT of each input may be achieved based on a maximum average output voltage. Moreover, there are no bulky energy storage elements, thus providing the potential for highly integrated and scalable converters 100 for multiple MPPT strings.

The energy exchanger 106 is based on a resonant balancer, which operates with soft switching and with no switching losses for high efficiency operation. Moreover, the operation may be with 50% fixed duty operation, which simplifies the gate driver and controller requirements with high potential for low cost production.

Furthermore, this embodiment provides the advantage that a highly integrated, low component energy buffer 102, 104, and an energy exchanger 106, which work together to form a DC-to-DC power converter 106, are provided.

Figure 4:
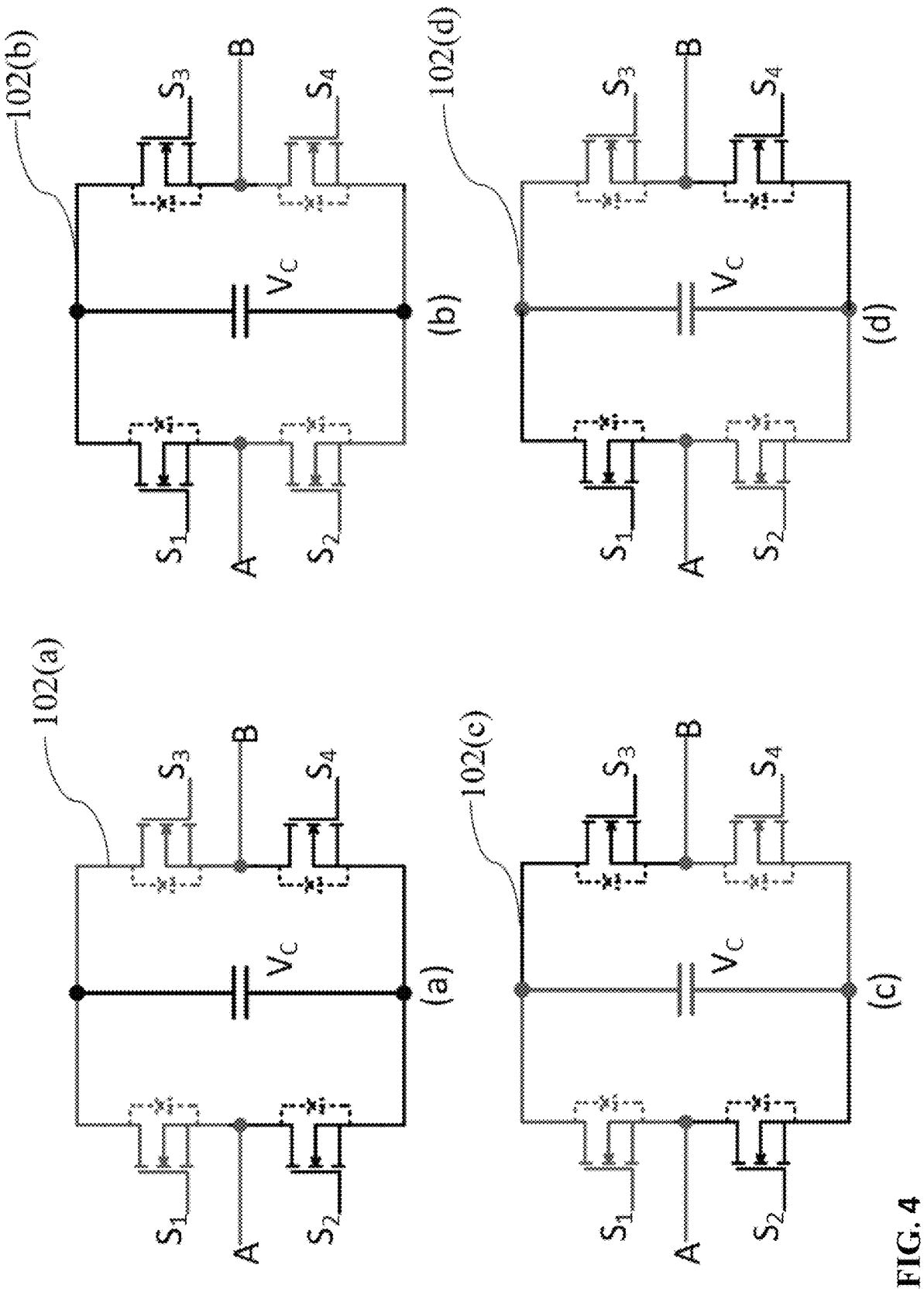
FIG. 4 shows a schematic representation of an energy buffer unit for a DC-to-DC converter according to an embodiment.

FIG. 4 shows a schematic representation of an energy buffer unit 102 for a DC-to-DC converter 100 according to an embodiment of the disclosure.

In this embodiment, the energy buffer unit 102 is based on a H-bridge circuit structure with low voltage semiconductor switches, such as MOSFETs (e.g., 150V OptiMOS5), wherein a, b, c, and d indicate different configurations of the energy buffer unit 102.

The H-bridge structure can be a half-bridge structure or a full-bridge structure.

In this embodiment, the energy buffer unit 102 is connected in series with an incoming DC source, as it is in the case of solar panels for example.

The function of the energy buffer units 102 is to add or subtract additional voltage buffer in the capacitor VC from the voltage VA, where necessary. Based on the status of the switches S2, S2, S3 and S4, the ideal (i.e. the best possible) voltage VB can be synthesized as:

for the configuration (a) or (b) VB=VA,
for the configuration (c) VB=VA−VC; and
for the configuration (d) VB=VA+VC.

These switches can be operated at relatively low frequency to synthesise VB.

The option to use 0, +Vc or −Vc can be based on the input voltage and the output common DC link. Any voltage level between −Vc and +Vc can be synthesized on average between the ports 'A' and 'B', for instance, based on the duty cycle of each of the switching states (a)/(b), (c) or (d).

The energy in each buffer capacitors can be supplied by energy exchangers/balancer unit(s) 106.

Figure 5:
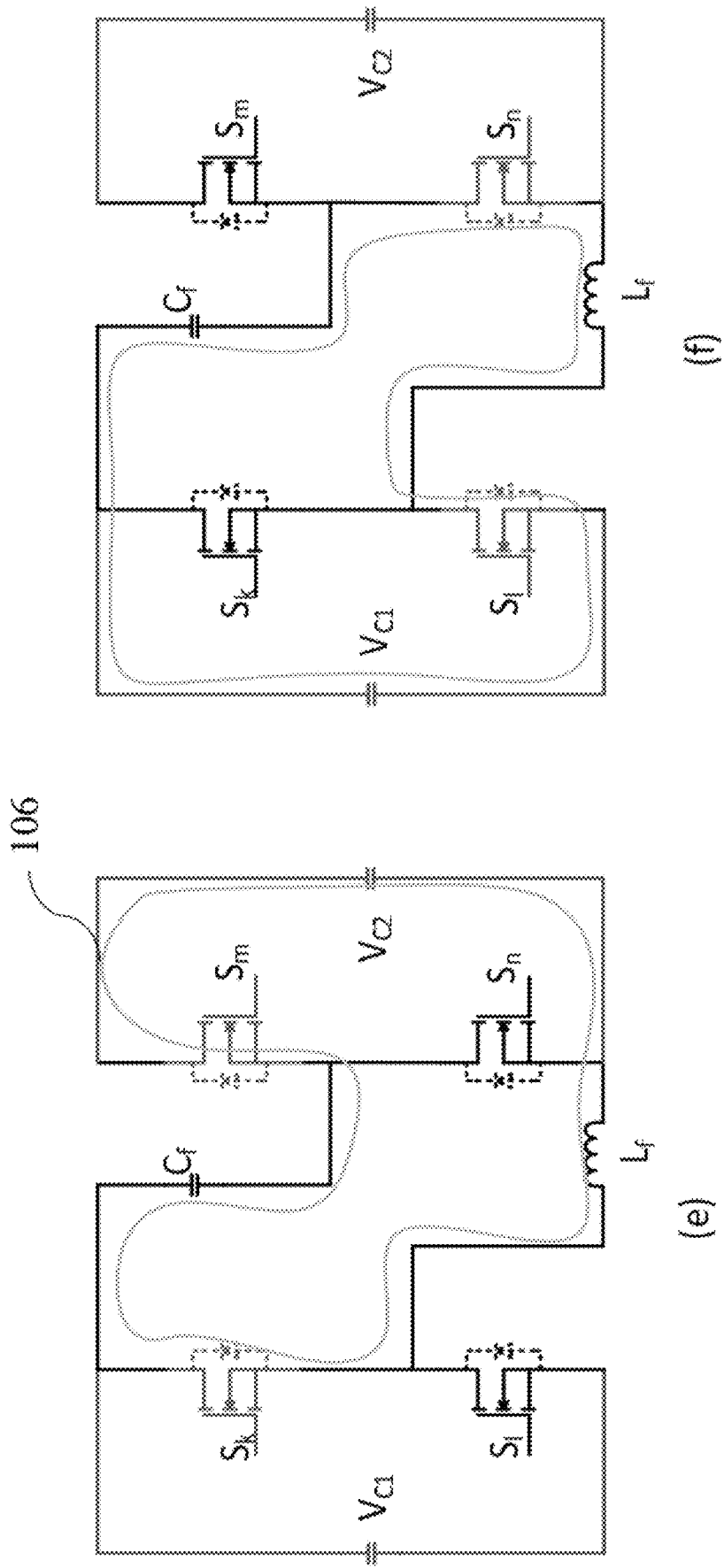
FIG. 5 shows a schematic representation of an energy exchanger unit for a DC-to-DC converter according to an embodiment.

FIG. 5 shows a schematic representation of an energy exchanger unit 106 for a DC-to-DC converter 100 according to an embodiment in different operation states (e) and (f).

The energy exchanger unit 106 can be based on a resonant balancer circuitry, wherein a resonant capacitor and inductor are excited to exchange energy between two ports, i.e. in this embodiment, between two capacitors, VC1 and VC2 in the energy buffer 102 and 104.

In this embodiment, in the state (e), the energy exchange occurs between Cf, Lf and VC2, while, in the state (f), the energy exchange occurs between Cf, Lf and VC1.

The switching between the two possible states (e) and (f) occurs ideally at a resonant frequency of the Lf and Cf. Therefore, advantageously, a lower size of the circuit can be achieved by moving towards a high frequency operation. A duty cycle between two possible states can be fixed at e.g. 50% duty. Therefore, simplified gate drivers and control hardware can be sufficient. During the state changes, a soft switching can be achieved, resulting in almost no switching losses.

Figure 6:
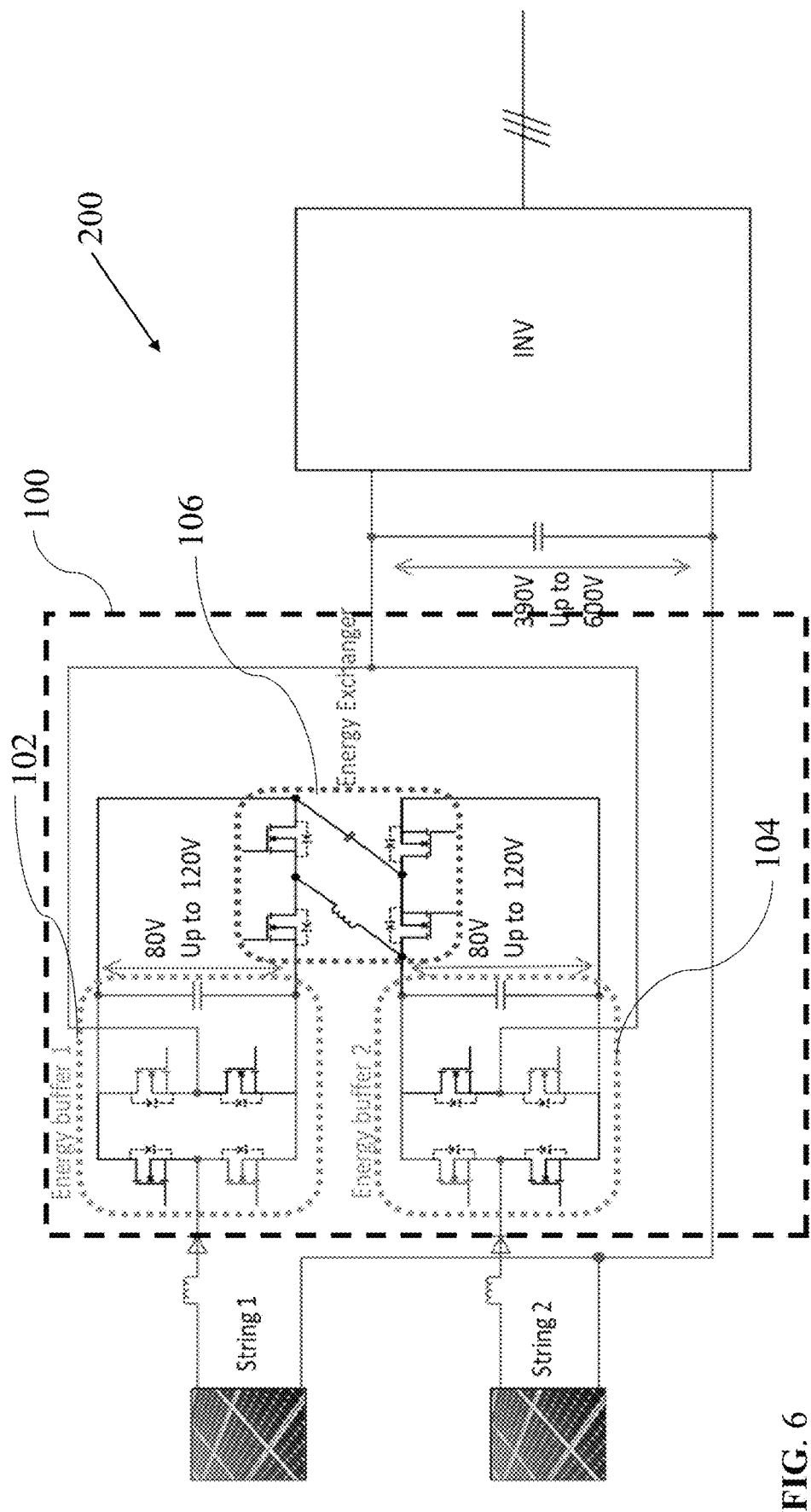
FIG. 6 shows a schematic representation of an electrical energy conversion system comprising a DC-to-DC converter according to an embodiment.

FIG. 6 shows a schematic representation of an electrical energy conversion system 200 comprising a DC-to-DC converter 100 according to an embodiment;

In particular, in FIG. 6 a possible embodiment for a residential solar PV inverter is represented.

In this embodiment, two energy buffer units 102 and 104 are connected in series with solar PV strings, string1 and string2. One energy exchanger 106 is connected between the two energy buffer units 102 and 104.

All circuit elements in the above embodiment may be based on low voltage semiconductor devices, such as MOSFETs. They are typically characterised by very low static and dynamic losses, low costs, and can be operated at higher switching frequencies.

Figure 7:
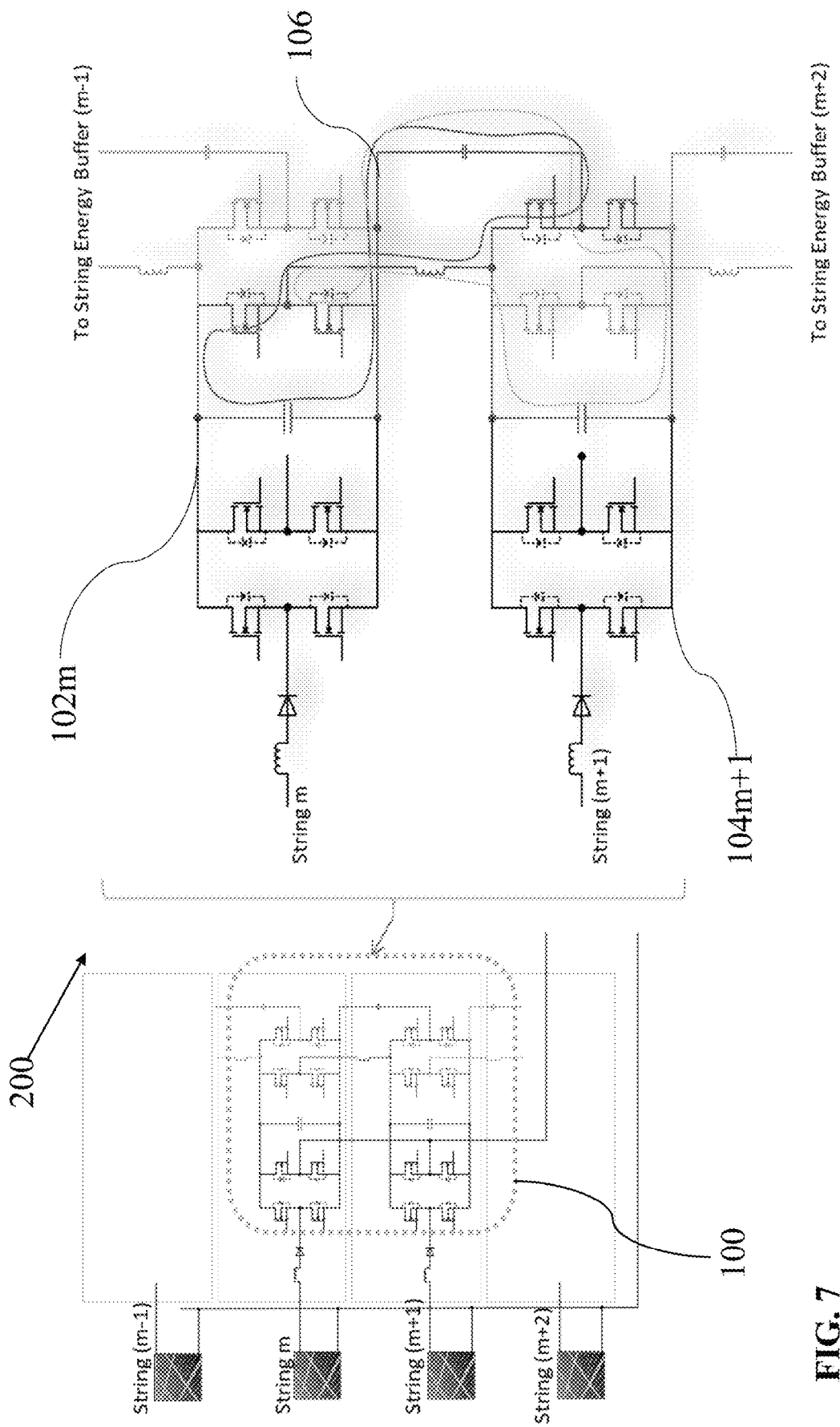
FIG. 7 shows a schematic representation of an electrical energy conversion system comprising a DC-to-DC converter according to an embodiment.

FIG. 7 shows a schematic representation of an electrical energy conversion system 200 comprising a DC-to-DC converter 100 according to an embodiment.

In particular, in FIG. 7 the embodiment shown in FIG. 6 is extended to a multi PV string scenario, wherein the energy buffer units 102*m* and 104*m*+1 can be similar to those of the embodiment of FIG. 6. However, the energy exchanger units 106 are here three port converters.

Figure 8:
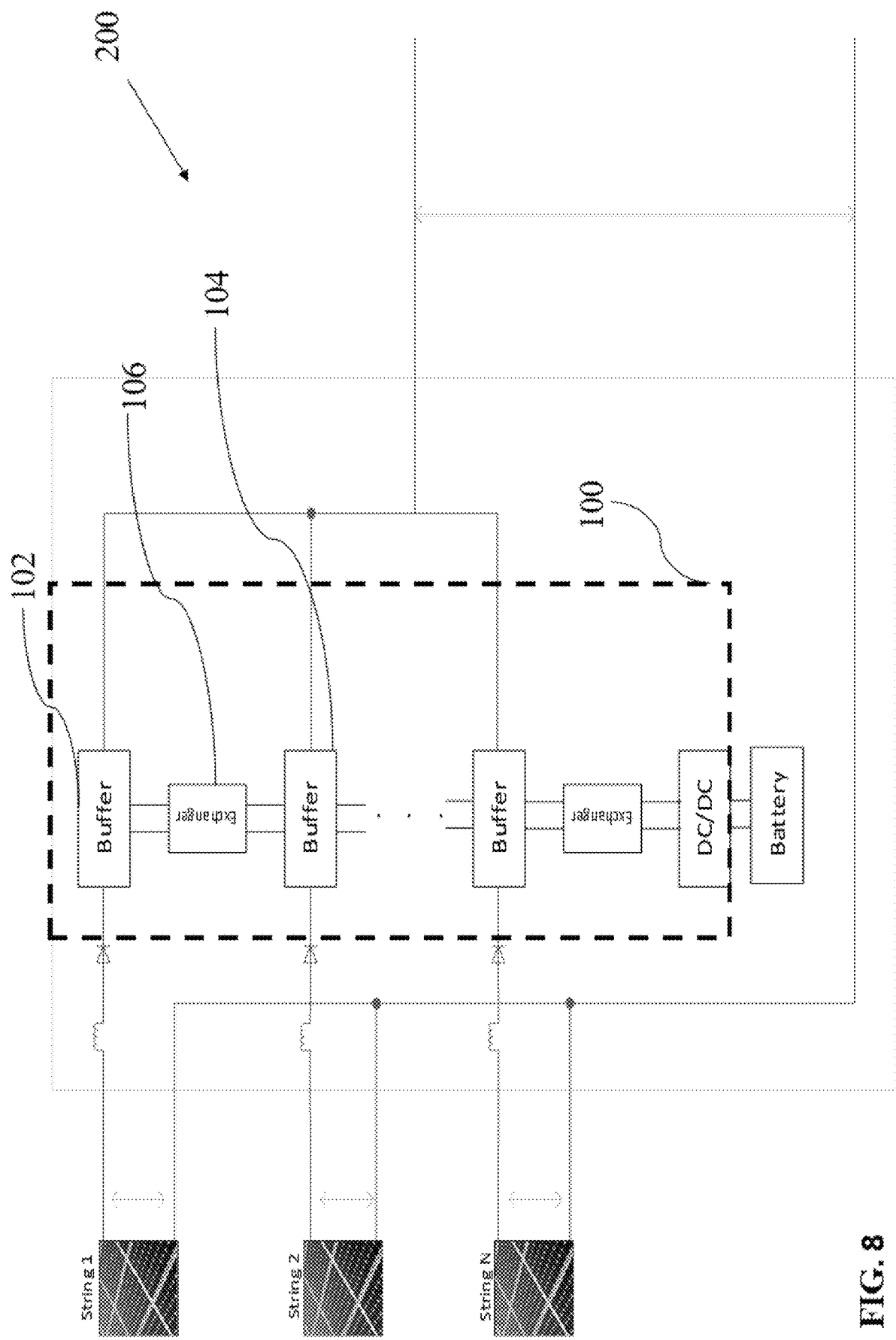
FIG. 8 shows a schematic representation of an electrical energy conversion system comprising a DC-to-DC converter according to an embodiment.

FIG. 8 shows a schematic representation of an electrical energy conversion system 200 comprising a DC-to-DC converter 100 according to an embodiment Embodiments of this disclosure can include energy storage elements, if for example there is an excess in energy generated from PV strings. In this case, some energy can be stored and reused when the energy generation is low, as shown in FIG. 8. These energy storage elements can be a battery, ultra-capacitors or a similar device. This facilitates to maximise the harvest in a long time, and provide flexibility to use the stored energy in case the solar energy is not available or minimal.

Figure 9:
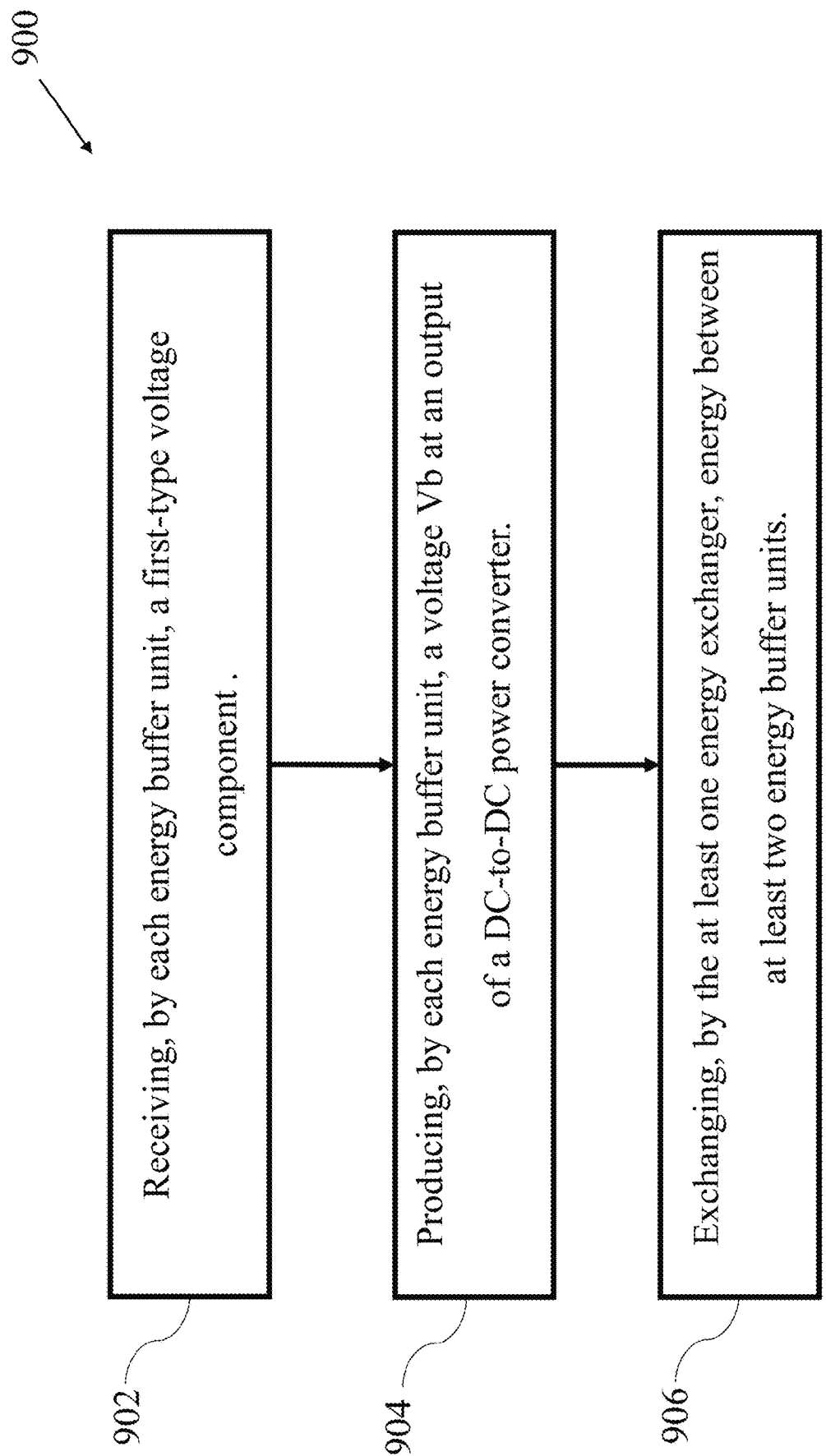
FIG. 9 shows a schematic representation of a method for a DC-to-DC power converter according to an embodiment.

FIG. 9 shows a schematic representation of a method 900 for a DC-to-DC power converter 100, comprising at least two energy buffer units 102 and 104 and at least one energy exchanger 106, according to an embodiment.

The method 900 comprises the following steps: receiving 902, by each energy buffer unit 102, 104, a first-type voltage component; producing 904, by each energy buffer unit 102, 104, a voltage Vb at an output of the DC-to-DC power converter 100; and exchanging 906, by the at least one energy exchanger 106, energy between at least two energy buffer units 102 and 104.

The present disclosure has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A DC-to-DC power converter comprising:
at least two energy buffers, each respective energy buffer of the at least two energy buffers being configured to receive a respective first-type voltage component and to produce a voltage Vb at an output of the DC-to-DC power converter, each respective energy buffer comprising a capacitor; and
at least one energy exchanger coupled between the at least two energy buffers, the at least one energy exchanger comprising a resonant balancer circuitry configured to exchange energy between the at least two energy buffers, the resonant balancer circuitry comprising four switches, a resonant capacitor and an inductor, and having two pairs of connections, each respective pair of connections is connected across the capacitor of each respective energy buffer, wherein the resonant capacitor and the inductor are excitable to:
in a first state of the four switches, exchange energy among the resonant capacitor, the inductor, and the capacitor of a first energy buffer of the at least two energy buffers, and
in a second state of the four switches, exchange energy among the resonant capacitor, the inductor, and
the capacitor of a second energy buffer of the at least two energy buffers,
wherein switching between the first state of the four switches and the second state of the four switches occurs at a resonant frequency of the resonant capacitor and the inductor.

2. The DC-to-DC power converter of claim 1, wherein each of the at least two energy buffers comprises a fullbridge structure.

3. The DC-to-DC power converter of claim 2, wherein the full-bridge structure comprises four low-voltage semiconductor switches.

4. The DC-to-DC power converter of claim 3, wherein for a voltage Vc across the capacitor of each respective energy buffer:

$$Vb = \begin{cases} Va \\ Va \pm Vc \end{cases},$$

wherein Va is the first-type voltage component received by the respective energy buffer.

5. The DC-to-DC power converter of claim 2, wherein for a voltage Vc across the capacitor of each respective energy buffer:

$$Vb = \begin{cases} Va \\ Va \pm Vc \end{cases},$$

wherein Va is the first-type voltage component received by the respective energy buffer.

6. The DC-to-DC power converter of claim 1, wherein each of the respective first-type voltage component is a positive voltage component or a negative voltage component.

7. The DC-to-DC power converter of claim 1, wherein each of the at least two energy buffers comprises a halfbridge structure.

8. An electrical energy conversion system comprising the DC-to-DC power converter according to claim 1.

9. The electrical energy conversion system of claim 8, further comprising a DC-to-AC inverter, and wherein the output of the DC-to-DC power converter is connected to the DC-to-AC inverter.

10. The electrical energy conversion system of claim 8, further comprising a DC transmission system, and wherein the output of the DC-to-DC power converter is connected to the DC transmission system.

11. The electrical energy conversion system of claim 8, further comprising a solid state transformer, and wherein the output of the DC-to-DC power converter is connected to the solid state transformer.

12. The electrical energy conversion system of claim 8, further comprising a battery, wherein the battery is configured to store an energy in excess generated from a solar panel.

13. The electrical energy conversion system of claim 12, further comprising ultra-capacitors, wherein the ultra-capacitors are configured to store an energy in excess generated from the solar panel.

14. A method for operating a DC-to-DC power converter, the method comprising:
   providing the DC-to-DC power converter, the DC-to-DC power converter comprising at least two energy buffers and at least one energy exchanger coupled between the at least two energy buffers, each respective energy buffer comprising a capacitor, the at least one energy exchanger comprising a resonant balancer circuitry configured to exchange energy between the at least two energy buffers, the resonant balancer circuitry comprising four switches, a resonant capacitor and an inductor, and having two pairs of connections, each respective pair of connections is connected across the capacitor of each respective energy buffer, wherein the resonant capacitor and the inductor are excitable to:
   in a first state of the four switches, exchange energy among the resonant capacitor, the inductor, and the capacitor of a first energy buffer of the at least two energy buffers, and
   in a second state of the four switches, exchange energy among the resonant capacitor, the inductor, and the capacitor of a second energy buffer of the at least two energy buffers;
   receiving, by each respective energy buffer of the at least two energy buffers, a first-type voltage component;
   producing, by each respective energy buffer of the at least two energy buffers, a voltage Vb at an output of the DC-to-DC power converter; and
   exchanging, by the at least one energy exchanger, energy between the at least two energy buffers,
   wherein switching between the first state of the four switches and the second state of the four switches occurs at a resonant frequency of the resonant capacitor and the inductor.

* * * * *